United States Patent
Matsukawa et al.

(10) Patent No.: US 9,725,039 B2
(45) Date of Patent: Aug. 8, 2017

(54) VEHICULAR VISIBILITY SUPPORT APPARATUS

(71) Applicant: DENSO CORPORATION, Kariya, Aichi-pref. (JP)

(72) Inventors: Norifumi Matsukawa, Kariya (JP); Muneaki Matsumoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 14/411,125

(22) PCT Filed: Jul. 18, 2013

(86) PCT No.: PCT/JP2013/004392
§ 371 (c)(1),
(2) Date: Dec. 24, 2014

(87) PCT Pub. No.: WO2014/017055
PCT Pub. Date: Jan. 30, 2014

(65) Prior Publication Data
US 2015/0191118 A1    Jul. 9, 2015

(30) Foreign Application Priority Data

Jul. 24, 2012    (JP) ................................. 2012-163830

(51) Int. Cl.
*B60R 1/00*      (2006.01)
*H04N 7/18*      (2006.01)
(Continued)

(52) U.S. Cl.
CPC ............ *B60R 1/00* (2013.01); *G06K 9/00805* (2013.01); *G06T 3/40* (2013.01); *H04N 7/183* (2013.01);
(Continued)

(58) Field of Classification Search
CPC combination set(s) only.
See application file for complete search history.

(56) References Cited

U.S. PATENT DOCUMENTS

2004/0201671 A1* 10/2004 Weis ...................... B60R 1/00
     348/142
2007/0173983 A1* 7/2007 Takahashi ................ B60R 1/00
     701/1

(Continued)

FOREIGN PATENT DOCUMENTS

| JP | 6-255423 A | 9/1994 |
| JP | 7-192200 A | 7/1995 |

(Continued)

OTHER PUBLICATIONS

International Search Report of the International Searching Authority mailed Sep. 3, 2013 for the corresponding International application No. PCT/JP2013/004392 (and English translation).

(Continued)

*Primary Examiner* — William C Vaughn, Jr.
*Assistant Examiner* — Lindsay Uhl
(74) *Attorney, Agent, or Firm* — Posz Law Group, PLC (57) ABSTRACT

In a vehicular visibility support apparatus, a camera positioned on a front portion that is either the left side or the right side of a vehicle provides an image of a view laterally behind the vehicle including a part of a face of the side of the vehicle as a camera image. An input portion accepts input manipulation to generate an input signal. A control portion trims a desired region in the camera image based on the input signal and provides a trimmed image. The control portion trims the camera image based on: a vertical reference line including a part of the face on the side of the vehicle in a trimmed image before the input manipulation is accepted by the input portion, and a horizontal reference line (Continued)

orthogonal to the vertical reference line; and a direction of movement for change to the desired region inputted to the input portion.

15 Claims, 6 Drawing Sheets

(51) Int. Cl.
    *G06K 9/00*      (2006.01)
    *G06T 3/40*      (2006.01)

(52) U.S. Cl.
    CPC ... *B60R 2300/305* (2013.01); *B60R 2300/306* (2013.01); *B60R 2300/50* (2013.01); *B60R 2300/602* (2013.01); *B60R 2300/802* (2013.01); *B60R 2300/8066* (2013.01); *B60R 2300/8093* (2013.01); *G06T 2210/22* (2013.01); *G06T 2210/61* (2013.01)

(56) References Cited

U.S. PATENT DOCUMENTS

| | | | |
|---|---|---|---|
| 2009/0040306 A1* | 2/2009 | Foote | B60Q 1/2665 348/148 |
| 2010/0201817 A1* | 8/2010 | Katoh | B60R 1/00 348/148 |
| 2011/0181728 A1 | 7/2011 | Tieman et al. | |
| 2012/0013742 A1* | 1/2012 | Fairchild | B60R 1/00 348/148 |

FOREIGN PATENT DOCUMENTS

| | | |
|---|---|---|
| JP | 11-321495 A | 11/1999 |
| JP | 2003-095028 A | 4/2003 |
| JP | 2003-219413 A | 7/2003 |
| JP | 2005-184142 A | 7/2005 |
| JP | 3916958 B2 | 2/2007 |
| JP | 2007-081590 A | 3/2007 |
| JP | 2007-109113 A | 4/2007 |
| JP | 2008-004990 A | 1/2008 |

OTHER PUBLICATIONS

Written Opinion of the International Searching Authority mailed Sep. 3, 2013 for the corresponding International application No. PCT/JP2013/004392 (and English translation).
Extended European Search Report dated Mar. 2, 2016 issued in corresponding EP patent application No. 13822915.8.

\* cited by examiner

VEHICULAR VISIBILITY SUPPORT APPARATUS

CROSS REFERENCE TO RELATED APPLICATION

The present disclosure is a U.S. national stage application of PCT/JP2013/004392 filed on Jul. 18, 2013 and is based on Japanese Patent Application No. 2012-163830 filed on Jul. 24, 2012, the disclosures of which are incorporated herein by reference.

TECHNICAL FIELD

The present disclosure relates to a vehicular visibility support apparatus that displays an image (video) of a view laterally behind a vehicle, picked up by, for example, a camera, in a display portion.

BACKGROUND ART

A conventional vehicular visibility support apparatus is indicated in Patent Literature 1, for example. The visibility support apparatus (vehicle rear view monitoring system) in Patent Literature 1 includes: a rear view camera for picking up an image of the view behind a vehicle; two side view cameras, left side and right side, for picking up an image of the view laterally behind the vehicle; and a display device to display the image picked up by each camera on a monitor screen surface.

An image picked up by the rear view camera is displayed on the monitor screen surface as a bird's-eye view image obtained when the periphery of the vehicle is viewed from a different eye view direction. The display device displays on the monitor screen surface an icon forming a frame shape in an area corresponding to a dead angle produced when an image is picked up with a rear view camera. The images picked up by the side view cameras are reduced or partly cut out and displayed in the icon.

As a result, the images picked up with the side view cameras on the left side and right side of the vehicle are displayed on the single monitor screen surface together with the bird's-eye view image. Therefore, if there is any dangerous object or obstacle behind or beside the vehicle, a driver can easily find the dangerous object or obstacle and avoid it with a leeway.

PRIOR ART LITERATURES

Patent Literature

Patent Literature 1: JP 2003-219413 A

However, Patent Literature 1 involves an issue. That is, the area for trimming an image taken by a side view camera is any one of an outer area away from a host vehicle; an inner area in proximity to the host vehicle; and an intermediate area between the outer area and the inner area. The displayed image thus exhibits none of a positional reference for the driver viewing the image on the monitor screen surface. This makes it difficult for the driver to instantaneously grasp the positional relation between any laterally rear obstacle or the like in the image and the host vehicle.

SUMMARY OF INVENTION

In consideration of the above issue, it is an object of the present disclosure to provide a vehicular visibility support apparatus that enables easy understanding of a positional relation between a host vehicle and an image even though such an image is obtained through a trimming manipulation. To achieve the object, the present disclosure adopts the following techniques.

An aspect of the present disclosure is provided to include a camera, an input portion, a control portion, and a display portion. The camera is provided on a side that is a left side or a right side of a vehicle, picks up an image of a view laterally behind the vehicle, and provides a camera image. The input portion accepts an input manipulation performed by an occupant to input a change to a desired region the occupant desires to view in the camera image. The control portion trims the desired region from the camera image based on an input signal generated by the input manipulation with the input portion to provide a trimmed image. The display portion displays the trimmed image trimmed by the control portion. The control portion trims the camera image based on a vertical reference line containing a part of the vehicle in a trimmed image before the input manipulation with the input portion and a horizontal reference line orthogonal to the vertical reference line; and a direction of movement for the change to the desired region inputted to the input portion.

According to the aspect, a trimmed image is changed based on the vertical reference line containing a part of the vehicle in a trimmed image before the input manipulation, the horizontal reference line, and the direction of movement of the desired region. Therefore, the trimmed screen image after the change makes it easy to grasp the positional relation to the host vehicle; furthermore, the association between the trimmed screen image before the change and the trimmed screen image after the change can be easily estimated.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereafter, a description will be given to a plurality of embodiments for carrying out the present disclosure with reference to the drawings. In the description of each embodiment, items corresponding to items precedently described in relation to a different embodiment will be marked with identical reference numerals and a redundant description thereof may be omitted. When only a part of the configuration of each embodiment is described, the precedent description of a different embodiment can be applied to the other parts of the configuration. Parts of embodiments can be combined when the feasibility of the concrete combination is explicitly stated. Further, even though not explicitly stated, embodiments can also be partly combined as long as the combination does not pose any problem.

First Embodiment

Figure 1:
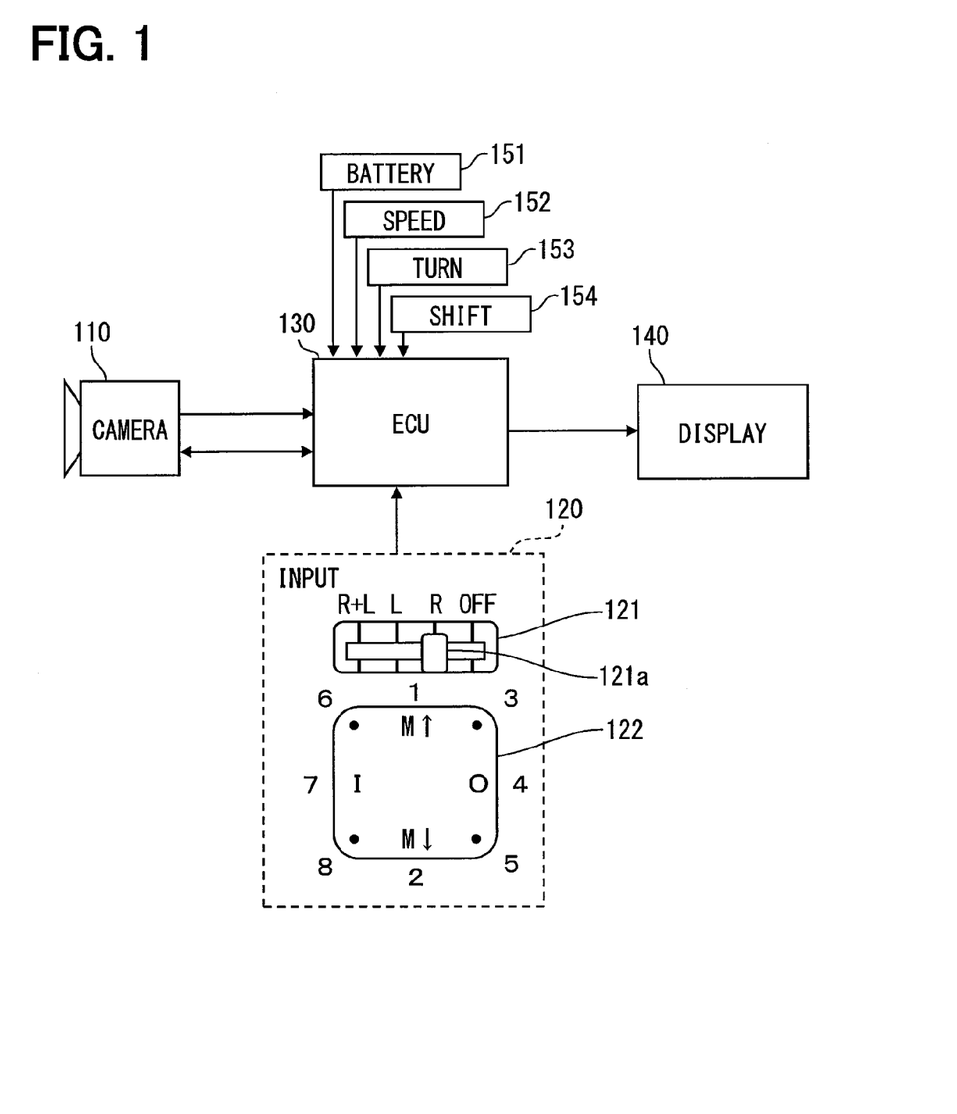
FIG. 1 is a block diagram illustrating an overall configuration of a vehicular visibility support apparatus.

A description will be given to a vehicular visibility support apparatus 100 in a first embodiment with reference to FIG. 1 to FIG. 6. The vehicular visibility support apparatus (hereafter, referred to as the visibility support apparatus) 100 acquires an image or video (hereafter, referred to as camera image) using a camera 110. This image is of the scenery laterally behind a vehicle viewed by an occupant of the vehicle through a conventional optical mirror (door mirror). Subsequently, this camera image is displayed on a display 140 provided in the vehicle compartment. Thus the driver (occupant) can be supported in checking the laterally rear area in place of the door mirror. As illustrated in FIG. 1, the visibility support apparatus 100 includes the camera 110, an input portion 120, a control portion 130, and the display 140.

The camera 110 is for picking up an image of the scenery laterally behind the vehicle and provided on each of side faces that are a left side face and a right side face of the vehicle. For example, the present embodiment may be applied to a vehicle of a right-hand drive. Two cameras 110 are provided in front of the front door on the driver seat side (right side of the vehicle) and in front of the front door on the passenger seat side (left side of the vehicle), and each camera 110 is positioned to be near an intermediate position in the vertical direction (near the position of a conventional door mirror). The two cameras 110, left and right, are respectively for picking up images of the laterally rear view on the driver seat side and the laterally rear view on the passenger seat side. The cameras 110 basically each have an identical function; therefore, the following description will be given mainly with the camera 110 provided on the driver seat side.

Figure 2:
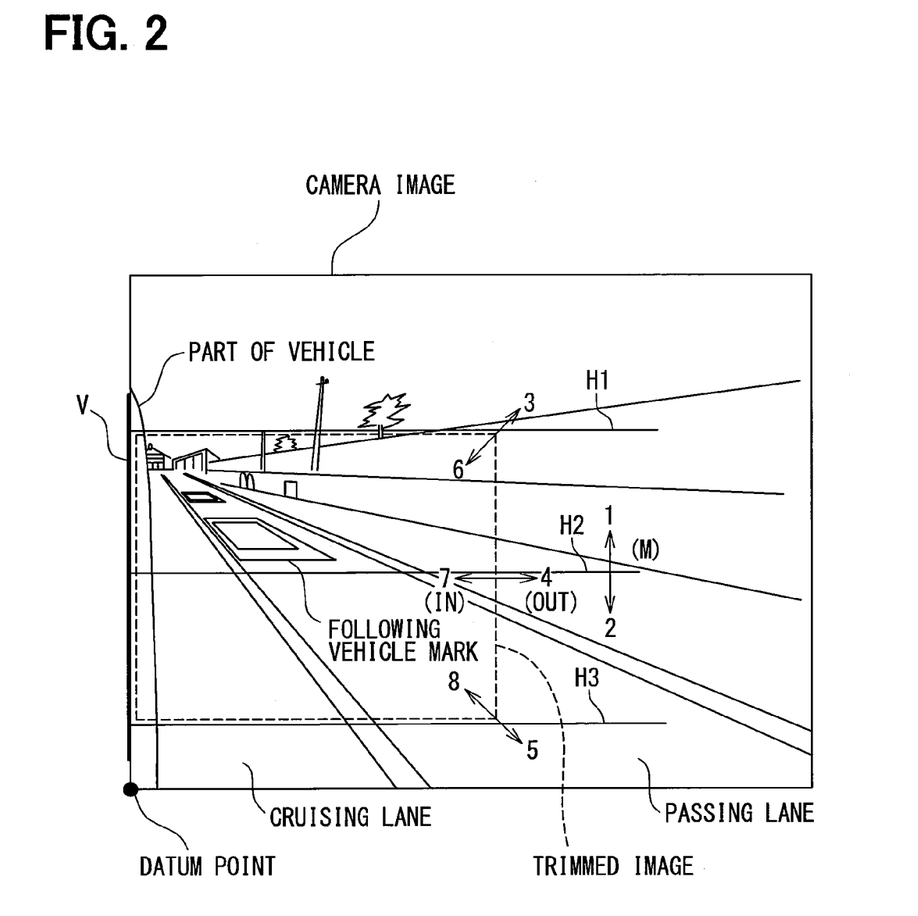
FIG. 2 is an explanatory drawing showing a camera image, a trimmed image, each reference line, and directions of movement of the trimmed image.

As illustrated in FIG. 2, the camera 110 picks up an image of a part of the host vehicle (a part of a side face of the vehicle) and the scenery widely extending laterally behind the vehicle. Then the camera 110 provides (or generates) a camera image. The camera image is such a video as in television or a movie. The camera image includes: a first image (first image data) obtained by picking up an image of the scenery as viewed laterally rearward from the position of the camera 110; and a second image (second image data) in horizontally inverted relation with the first image. The second image is identical with the laterally rearward scenery viewed by an occupant through a conventional optical mirror (door mirror) in left and right relation. This camera image (that is, the second image) is inputted as a video signal to the control portion 130. When conversion from the primary image to the secondary image is separately required, the conversion is performed at the camera 110; however, the conversion may be performed at the control portion 130. The following description will be given on the assumption that the camera image is the second image.

When input manipulation is performed by the driver with the input portion 120, a desired region (trimmed image to be described later) the driver desires to view in the camera image can be changed (selected). The input portion 120 is provided, for example, in proximity to the driver seat (steering wheel) in the vehicle compartment. The input portion 120 is provided with a selector switch 121 and a manipulation switch 122.

The selector switch 121 is used to select which camera 110 of the two cameras 110, left and right, to be manipulated. The selector switch 121 is provided with the positions of: "OFF" to prohibit selecting manipulation; "R (Right)" to select the camera 110 on the driver seat side; "L (Left)" to select the camera 110 on the passenger seat side; and "R+L" to select both the cameras 110. Any position can be selected by a lever 121a.

The manipulation switch 122 is used to determine a direction of movement for changing the current position of the desired region in the camera image. The manipulation switch 122 is rectangular and supported at the center and the positions (eight in total) corresponding to the middle point in each side and each corner can be depressed. A position depressed in the manipulation switch 122 is determined as the direction of movement of the desired region. As illustrated in FIG. 1, the directions of movement of 1 to 8 are provided. 1 denotes upward; 2 denotes downward; 3 denotes upper rightward; 4 denotes rightward; 5 denotes lower rightward; 6 denotes upper leftward; 7 denotes leftward; and 8 denotes lower leftward.

Selection or manipulation through input manipulation with the selector switch 121 or the manipulation switch 122 is outputted as an input signal to the control portion 130.

The control portion 130 processes (trims) a camera image (video signal) outputted from the camera 110 and is provided, for example, in the instrument panel in front of the driver seat. The control portion 130 receives a camera image from a selected one of the two cameras 110 based on an input signal inputted from the input portion 120 and changes the desired region established in the camera image to a selected direction of movement. The control portion 130 trims the changed desired region from the camera image to generate a trimmed image (video). The control portion 130 then enlarges or reduces the trimmed image to the size of the screen surface of the display 140 and outputs it as a video signal.

A description will be added with reference to FIG. 2. When the camera 110 is installed on the right side face of a right hand drive car, the driver is positioned in the seat on the front right side of the vehicle. In this case, the camera image as the second image looks as if the driver could widely view the laterally rear scenery on the right side of the vehicle through the right door mirror. The left end of the camera image shows a part (front door portion or the like) of the side face of the vehicle. (If a laterally rear scenery is viewed directly from the camera position, namely, if the laterally rear view belongs to the first image that is left-right inverted to the second image, the side face of the vehicle is shown on the right of the image.) The camera image shown in FIG. 2 is picked up by way of trial. It is assumed that the host vehicle is running in the cruising lane and a following vehicle in the passing lane is indicated by a rectangular mark.

The trimmed image is selected as the driver's desired region in the camera image and shows an area smaller than that of the camera image. The position of the side at the left end of the trimmed image agrees with the position of the side at the left end of the camera image.

In the trimmed image, a vertical reference line V and first to third horizontal reference lines H1 to H3 are defined. The vertical reference line V includes the displayed part of the vehicle and is vertically extended along the side at the left end of the trimmed image. The first to third horizontal reference lines H1 to H3 are orthogonal to the vertical reference line V and the first horizontal reference line H1 is horizontally extended along the side at the upper end of the trimmed image. The second horizontal reference line H2 passes through a central portion of the trimmed image and is horizontally extended. The third horizontal reference line H3 is horizontally extended along the side at the lower end of the trimmed image.

Each of the reference lines V and H1 to H3 may be displayed actually on the display 140 as illustrated in FIG. 2 or may not.

When the position at the lower left corner of the camera image is taken as the positional reference of the camera image, the dimension H of the trimmed image in the vertical direction is defined as H1–H3. The dimension of the trimmed image in the horizontally direction is set as a predetermined multiple of (for example, 4/3 times) the dimension H in the vertical direction.

The description will be back to FIG. 1. The control portion 130 is supplied with power from the battery 151 of the vehicle at the same time as turn-on of the ignition switch. The control portion 130 supplies this power to the cameras 110. The control portion 130 is inputted with such signals as: a speed signal from a speed sensor 152; an actuation signal (signal indicating which traffic indicator, left or right, has been actuated) from a traffic indicator 153; and a gear selection signal from a gear shift lever 154. The traffic indicator is also referred to as a blinker or winker.

The display 140 displays the trimmed image generated at the control portion 130 as a display image (display video) and is provided in a position clearly visible to the driver, for example, in the instrument panel. The display 140 can be constructed using, for example, a liquid crystal display, or an organic EL display. The display portion of the display 140 is divided into, for example, two display areas, left and right. The right display area shows an image picked up by the camera 110 on the driver seat side and the left display area shows an image picked up by the camera 110 on the passenger seat side.

A description will be given to the action of the visibility support apparatus 100 configured as mentioned up to this point with reference to FIG. 3 to FIG. 6 as well.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

Figure 3:
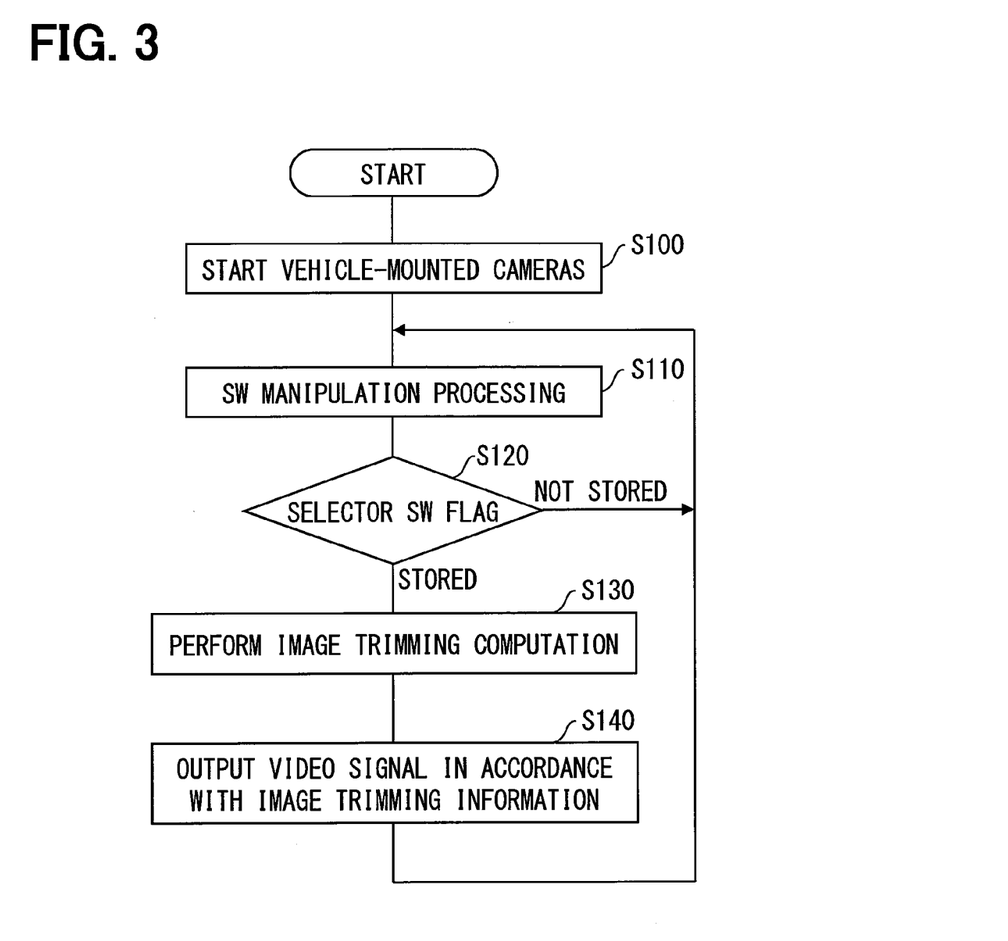
FIG. 3 is a flowchart showing a procedure for a process of trimming an image from a camera image performed by a control portion.

When the ignition switch is turned on and power is supplied to the control portion 130 in the flowchart shown in FIG. 3, the control portion 130 starts a control flow. At S100, first, the control portion 130 supplies power to the cameras 110 to start the cameras 110.

At S110, subsequently, the control portion 130 performs processing (a switch manipulation process) based on the driver's manipulation with each switch 121, 122 in the input portion 120. The control portion 130 performs the switch manipulation process in accordance with the control flow shown in FIG. 4. The switch manipulation process is repetitively performed at predetermined time intervals.

Figure 4:
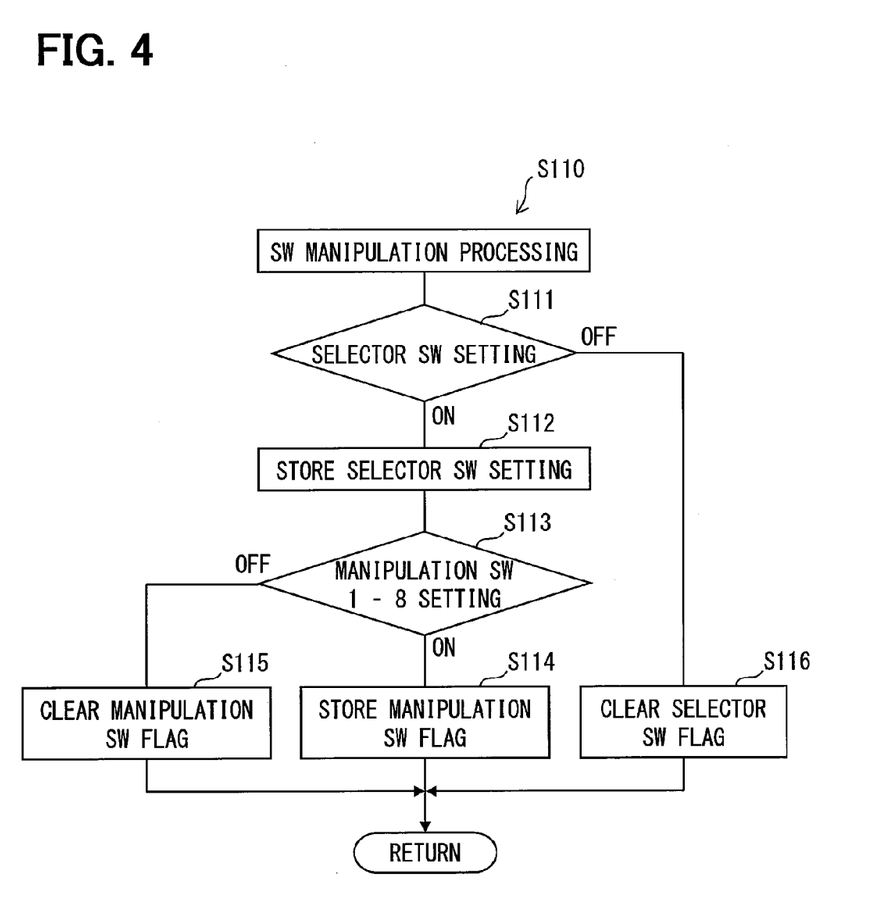
FIG. 4 is a flowchart showing a switch manipulation process in FIG. 3.

At S111, first, the control portion 130 determines whether the input state of the selector switch 121 is on state or off state. The on state cited here is equivalent to a case where the selection (position) of the selector switch 121 is any of "R," "L," and "R+L"; and the off state is equivalent to a case where the selection (position) of the selector switch 121 is "OFF." When it is determined at S111 that the input state is on, the control portion 130, at S112, generates and stores a selector switch flag (R, L, or R+L) corresponding to a selected position.

At S113, subsequently, the control portion 130 determines whether the input state of the manipulation switch 122 is on state or off state. The on state cited here is equivalent to a case where the depressed position in the manipulation switch 122 is any of "1" to "8"; and the off state is equivalent to a case where the manipulation switch 122 has not been manipulated (the switch has been untouched). When it is determined at S113 that the input state is on, the control portion 130, at S114, generates and stores a manipulation switch flag (any of 1 to 8) corresponding to the depressed position.

When it is determined at S113 that the input state of the manipulation switch 122 is off state, the control portion 130, at S115, clears the manipulation switch flag stored up to then. When it is determined at S111 that the input state of the selector switch 121 is off state, the control portion 130, at S116, clears the selector switch flag stored up to then.

The description will be back to FIG. 3. At S120, subsequent to S110, the control portion 130 determines whether or not any selector switch flag has been stored. When a selector switch flag has been stored, the control portion 130 proceeds to S130; and when a selector switch flag has not been stored, the control portion 130 returns to S110.

At S130, the control portion 130 performs image trimming processing based on the selector switch flag, the manipulation switch flag, and the present image information (the reference lines V and H1 to H3 in the trimmed image). At S140, the control portion 130 outputs the video signal of the trimmed image generated by the image trimming processing of S130 to the display 140 and causes the display 140 to display the trimmed image. The control portion 130 performs the image trimming processing of S130 in accordance with the control flow shown in FIG. 5.

Figure 5:
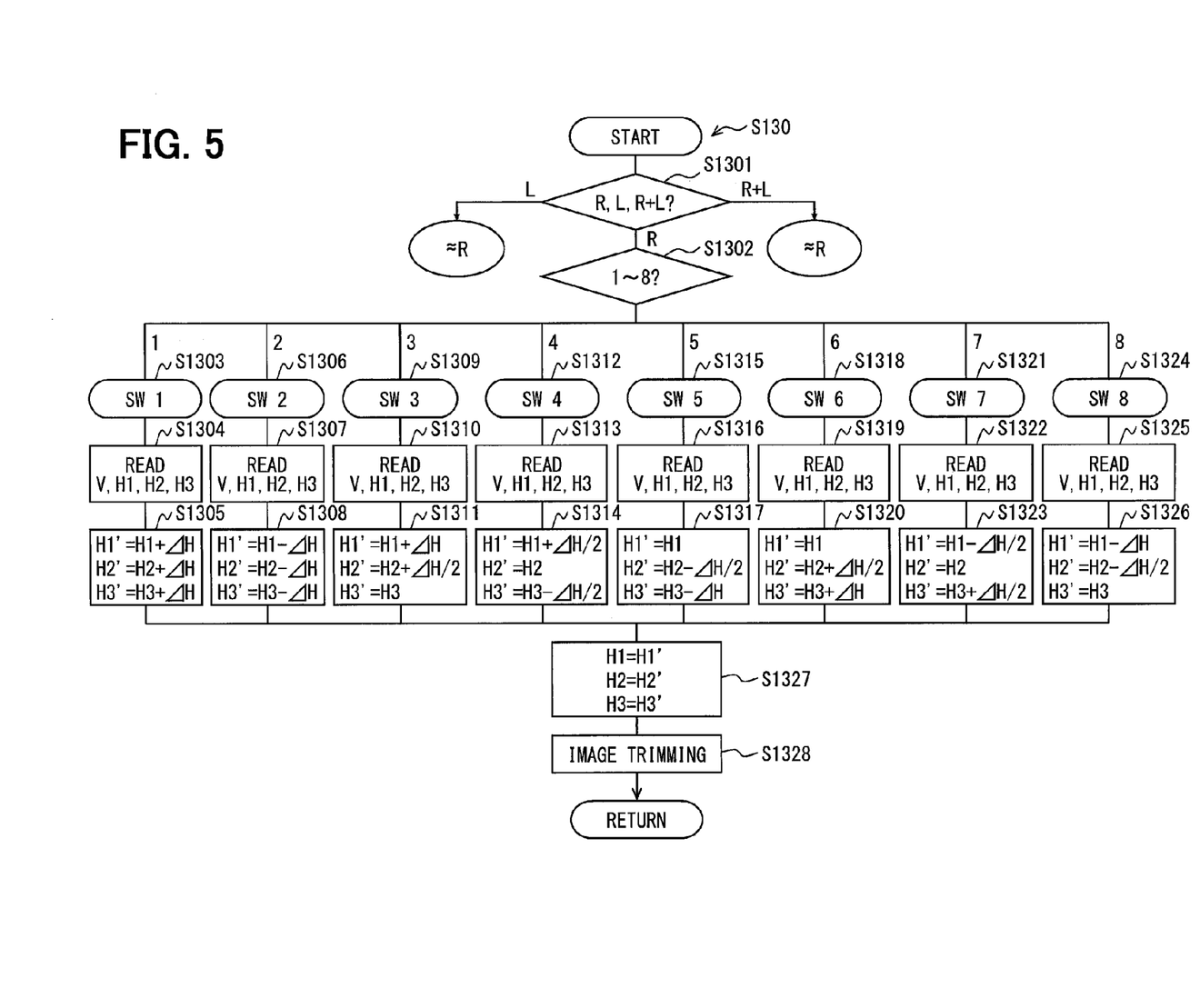
FIG. 5 is a flowchart showing image processing in FIG. 3.

At S1301, first, the control portion 130 determines which one of R, L, and R+L is the selector switch flag and when it is determined that the selector switch flag is R, the control portion 130 proceeds to S1302. At S1302, the control portion 130 determines which one of 1 to 8 is the manipulation switch flag. Then the control portion 130 proceeds to any of S1303, S1306, S1309, S1312, S1315, S1318, S1321, and S1324 according to the determined manipulation switch flag (1 to 8). The control portion 130 changes the position of each reference line H1 to H3 based on each reference line V and H1 to H3 in the present trimmed image and a direction of movement (manipulation switch flag 1 to 8). Further, the control portion 130 generates a new trimmed image at S1327 and at S1328.

Figure 6:
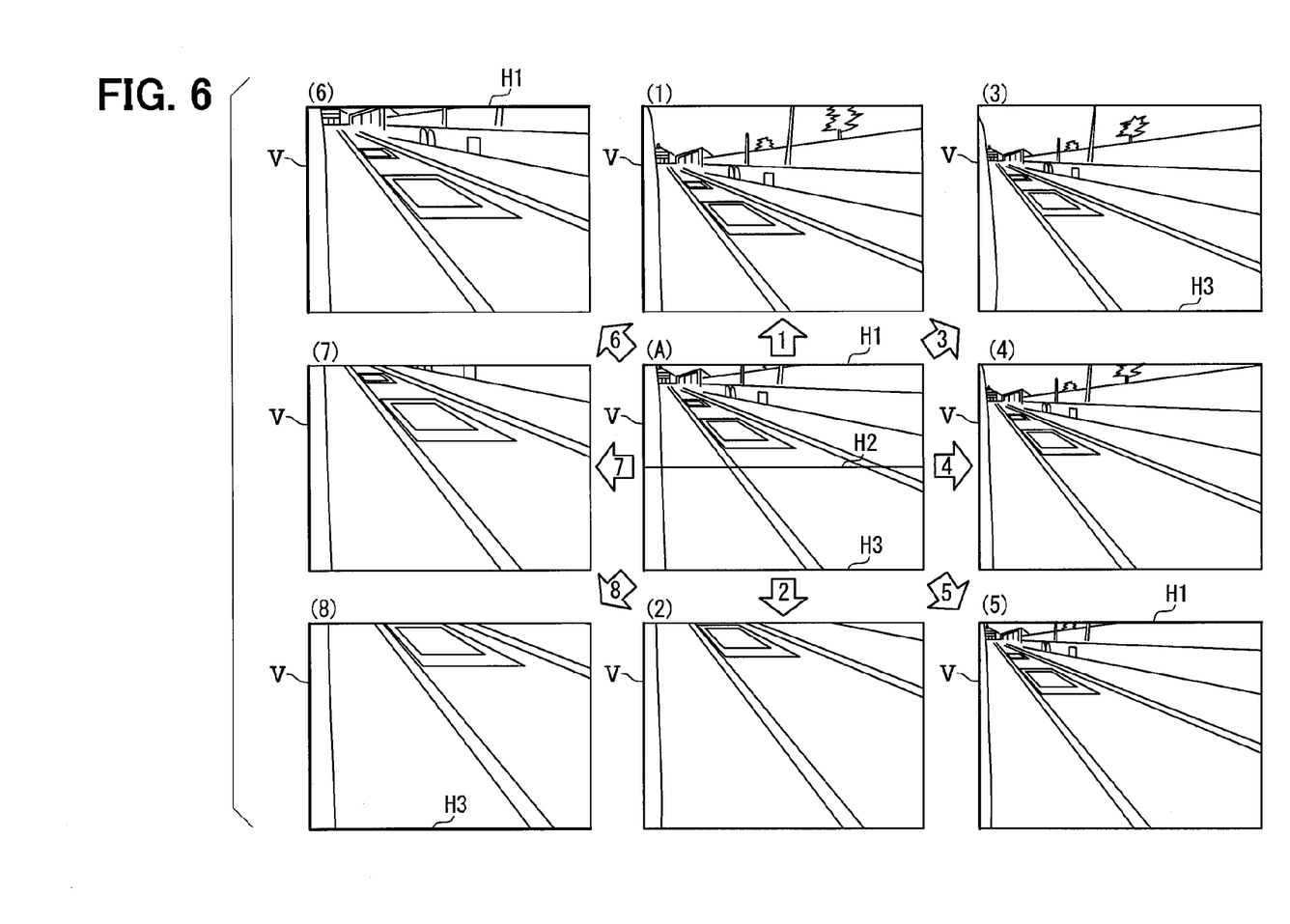
FIG. 6 is an explanatory drawing showing directions of movement of a present trimmed image and trimmed images after movement.

A more specific description will be given. When the manipulation switch flag is 1, the control portion 130 proceeds S1303 and performs processing based on the manipulation switch flag 1. Specifically, the control portion 130 performs the processing of the following steps, S1304 and S1305. At S1304, the control portion 130 reads each reference line V and H1 to H3 in the present trimmed image (FIG. 6(A)) with respect to the camera image.

The direction of movement of the trimmed image specified by the manipulation switch 122 is 1 (upward); at S1305, the present trimmed image (FIG. 6(A)) is changed such that the second horizontal reference line H2 is moved upward in accordance with the vertical reference line V. That is, a predetermined amount ΔH is added to the coordinate position of each horizontal reference line H1, H2, and H3 and the coordinate position is changed to the horizontal reference line H1'=H1+ΔH, the horizontal reference line H2'=H2+ΔH, and the horizontal reference line H3'=H3+ΔH.

When the manipulation switch flag is 2, the control portion 130 proceeds to S1306 and performs processing based on the manipulation switch flag 2. Specifically, the control portion 130 performs the processing of the following steps, S1307 and S1308. At S1307, the control portion 130 reads each reference line V and H1 to H3 in the present trimmed image (FIG. 6(A)) with respect to the camera image.

Since the direction of movement of the trimmed image specified by the manipulation switch 122 is 2 (downward); at S1308, the present trimmed image (FIG. 6(A)) is changed such that the second horizontal reference line H2 is moved downward in accordance with the vertical reference line V. That is, the predetermined amount ΔH is subtracted from the coordinate position of each horizontal reference line H1, H2, H3 and the coordinate position is changed to the horizontal reference line H1'=H1−ΔH, the horizontal reference line H2'=H2−ΔH, and the horizontal reference line H3'=H3−ΔH.

When the manipulation switch flag is 3, the control portion 130 proceeds to S1309 and performs processing based on the manipulation switch flag 3. Specifically, the control portion 130 performs the processing of the following steps, S1310 and S1311. At S1310, the control portion 130 reads each reference line V and H1 to H3 in the present trimmed image (FIG. 6(A)) with respect to the camera image.

Since the direction of movement of the trimmed image specified by the manipulation switch 122 is 3 (upper rightward); at S1311, the present trimmed image (FIG. 6(A)) is changed such that the first horizontal reference line H1 and the second horizontal reference line H2 are moved upward in accordance with the vertical reference line V and the third horizontal reference line H3. That is, the predetermined amount ΔH is added to the coordinate position of the first horizontal reference line H1 and the coordinate position is changed to the first horizontal reference line H1'=H1+ΔH; and a predetermined amount ΔH/2 is added to the coordinate position of the second horizontal reference line H2 and the coordinate position is changed to the second horizontal reference line H2'=H2+ΔH/2. The coordinate position of the third horizontal reference line H3 is taken as that of H3' without being changed.

When the manipulation switch flag is 4, the control portion 130 proceeds to S1312 and performs processing based on the manipulation switch flag 4. Specifically, the control portion 130 performs the processing of the following steps, S1313 and S1314. At S1313, the control portion 130 reads each reference line V and H1 to H3 in the present trimmed image (FIG. 6(A)) with respect to the camera image.

Since the direction of movement of the trimmed image specified by the manipulation switch 122 is 4 (rightward); at S1314, the present trimmed image (FIG. 6(A)) is changed such that the first horizontal reference line H1 is moved upward and the third horizontal reference line H3 is moved downward in accordance with the vertical reference line V and the second horizontal reference line H2. That is, the predetermined amount ΔH/2 is added to the coordinate position of the first horizontal reference line H1 and the coordinate position is changed to the first horizontal reference line H1'=H1+ΔH/2; and the predetermined amount ΔH/2 is subtracted from the coordinate position of the third horizontal reference line H3 and the coordinate position is changed to the third horizontal reference line H3'=H3−ΔH/2.

The coordinate position of the second horizontal reference line H2 is taken as that of H2' without being changed.

When the manipulation switch flag is 5, the control portion 130 proceeds to S1315 and preforms processing based on the manipulation switch flag 5. Specifically, the control portion 130 performs the processing of the following steps, S1316 and S1317. At S1316, the control portion 130 reads each reference line V and H1 to H3 in the present trimmed image (FIG. 6(A)) with respect to the camera image.

Since the direction of movement of the trimmed image specified by the manipulation switch 122 is 3 (lower rightward); at S1317, the present trimmed image (FIG. 6(A)) is changed such that the second horizontal reference line H2 and the third horizontal reference line H3 are moved downward in accordance with the vertical reference line V and the first horizontal reference line H1. That is, the predetermined amount ΔH/2 is subtracted from the coordinate position of the second horizontal reference line H2 and the coordinate position is changed to the second horizontal reference line H2'=H2−ΔH/2; and the predetermined amount ΔH is subtracted from the coordinate position of the third horizontal reference line H3 and the coordinate position is changed to the third horizontal reference line H3'=H3−ΔH. The coordinate position of the first horizontal reference line H1 is taken as that of H1' without being changed.

When the manipulation switch flag is 6, the control portion 130 proceeds to S1318 and performs processing based on the manipulation switch flag 6. Specifically, the control portion 130 performs the processing of the following steps, S1319 and S1320. At S1319, the control portion 130 reads each reference line V and H1 to H3 in the present trimmed image (FIG. 6(A)) with respect to the camera image.

Since the direction of movement of the trimmed image specified by the manipulation switch 122 is 3 (upper leftward); at S1319, the present trimmed image (FIG. 6(A)) is changed such that the second horizontal reference line H2 and the third horizontal reference line H3 are moved upward in accordance with the vertical reference line V and the first horizontal reference line H1. That is, the predetermined amount ΔH/2 is added to the coordinate position of the second horizontal reference line H2 and the coordinate position is changed to the second horizontal reference line H2'=H2+ΔH/2; and the predetermined amount ΔH is added to the coordinate position of the third horizontal reference line H3 and the coordinate position is changed to the third horizontal reference line H3'=H3+ΔH. The coordinate position of the first horizontal reference line H1 is taken as that of H1' without being changed.

When the manipulation switch flag is 7, the control portion 130 proceeds to S1321 and performs processing based on the manipulation switch flag 7. Specifically, the control portion 130 performs the processing of the following steps, S1322 and S1323. At S1322, the control portion 130 reads each reference line V and H1 to H3 in the present trimmed image (FIG. 6(A)) with respect to the camera image.

Since the direction of movement of the trimmed image specified by the manipulation switch 122 is 4 (leftward); at S1323, the present trimmed image (FIG. 6(A)) is changed such that the first horizontal reference line H1 is moved downward and the third horizontal reference line H3 is moved upward in accordance with the vertical reference line V and the second horizontal reference line H2. That is, the predetermined amount ΔH/2 is subtracted from the coordinate position of the first horizontal reference line H1 and the coordinate position is changed to the first horizontal reference line H1'=H1−ΔH/2; and the predetermined amount ΔH/2 is added to the coordinate position of the third horizontal reference line H3 and the coordinate position is changed to the third horizontal reference line H3'=H3+ΔH/2. The coordinate position of the second horizontal reference line H2 is taken as that of H2' without being changed.

When the manipulation switch flag is 8, the control portion 130 proceeds to S1324 and performs processing based on the manipulation switch flag 8. Specifically, the control portion 130 performs the processing of the following steps, S1325 and S1326. At S1325, the control portion 130 reads each reference line V and H1 to H3 in the present trimmed image (FIG. 6(A)) with respect to the camera image.

Since the direction of movement of the trimmed image specified by the manipulation switch 122 is 3 (lower leftward); at S1326, the present trimmed image (FIG. 6(A)) is changed such that the first horizontal reference line H1 and the second horizontal reference line H2 are moved downward in accordance with the vertical reference line V and the third horizontal reference line H3. That is, the predetermined amount ΔH is subtracted from the coordinate position of the first horizontal reference line H1 and the coordinate position is changed to the first horizontal reference line H1'=H1−ΔH; and the predetermined amount ΔH/2 is subtracted from the coordinate position of the second horizontal reference line H2 and the coordinate position is changed to the second horizontal reference line H2'=H2−ΔH/2. The coordinate position of the third horizontal reference line H3 is taken as that of H3' without being changed.

At S1327, subsequently, the control portion 130 stores each reference line H1' to H3' set at S1305, S1308, S1311, S1314, S1317, S1320, S1323, or S1326 as each reference line H1 to H3.

At S1328, the control portion 130 sets a region determined by the reference line V and each newly set reference line H1, H3 as the region of the new trimmed image. That is, the control portion 130 sets a dimension in the horizontal direction so that the dimension in the horizontal direction is a predetermined multiple of (4/3 times) the dimension in the vertical direction of the new trimmed image defined by H1−H3 (=H1'−H3'). Then the control portion 130 trims the region as a new trimmed image from the camera image.

When the manipulation switch flag is 1 (when the direction of movement is upward), each reference line H1 to H3 is moved upward relative to the vertical reference line V. The region on the upper side of the present trimmed image in FIG. 6(A) is newly captured and the region on the lower side is excluded in the camera image and the image shown in FIG. 6(1) is provided.

When the manipulation switch flag is 2 (when the direction of movement is downward), each reference line H1 to H3 is moved downward relative to the vertical reference line V. The region on the lower side of the present trimmed image in FIG. 6(A) is newly captured and the region on the upper side is excluded in the camera image and the image shown in FIG. 6(2) is provided.

When the manipulation switch flag is 3 (when the direction of movement is upper rightward), each reference line H1, H2 is moved upward relative to the vertical reference line V and the third horizontal reference line H3. The regions on the upper side and the right side, that is, the region on the upper right side of the present trimmed image in FIG. 6(A) is newly captured in the camera image and the image shown in FIG. 6(3) is provided.

When the manipulation switch flag is 4 (when the direction of movement is rightward), the first horizontal reference line H1 is moved upward and the third horizontal reference line H3 is moved downward relative to the vertical reference line V and the second horizontal reference line H2. The regions on the upper side, the lower side, and the right side, broadly the region on the right side of the present trimmed image in FIG. 6(A) is newly captured in the camera image and the image shown in FIG. 6(4) is provided.

When the manipulation switch flag is 5 (when the direction of movement is lower rightward), the second and third horizontal reference lines H2, H3 are moved downward relative to the vertical reference line V and the first horizontal reference line H1. The regions on the lower side and the right side, broadly the region on the lower right side of the present trimmed image in FIG. 6(A) is newly captured in the camera image and the image shown in FIG. 6(5) is provided.

When the manipulation switch flag is 6 (when the direction of movement is upper leftward), the second and third horizontal reference lines H2, H3 are moved upward relative to the vertical reference line V and the first horizontal reference line H1. The regions on the right side and the lower side of the present trimmed image in FIG. 6(A) are excluded and the region with weight placed on the upper left side is newly captured in the camera image and the image shown in FIG. 6(6) is provided.

When the manipulation switch flag is 7 (when the direction of movement is leftward), the first horizontal reference line H1 is moved downward and the third horizontal reference line H3 is moved upward relative to the vertical reference line V and the second horizontal reference line H2. The regions on the upper side, the lower side, and the right side of the present trimmed image in FIG. 6(A) are excluded and the region with weight placed on the left side is newly captured in the camera image and the image shown in FIG. 6(7) is provided.

When the manipulation switch flag is 8 (when the direction of movement is lower leftward), each reference line H1, H2 is moved downward relative to the vertical reference line V and the third horizontal reference line H3. The regions on the upper side and the right side of the present trimmed image in FIG. 6(A) are excluded and the region with weight placed on the lower left side is newly captured in the camera image and the image shown in FIG. 6(8) is provided.

When it is determined at S1301 that the selector switch flag is L, at S1329, the same control as of S1302 to S1328 is carried out with the camera 110 provided on the passenger seat side.

When it is determined at S1301 that the selector switch flag is R+L, at S1329, the same control as of S1302 to S1328 is carried out with both the cameras 110 provided on the driver seat side and on the passenger seat side. In this case, the control portion 130 performs trimming processing on the camera image of the camera 110 on the driver seat side similarly to the processing of S1302 to S1328. As for the camera image of the camera 110 on the passenger seat side, the control portion 130 performs trimming processing so that the trimmed image is left-right symmetrical with trimming in the camera image of the camera 110 on the driver seat side.

In this embodiment, as described up to this point, image trimming processing is performed based on: the vertical reference line V including a part of the vehicle in a trimmed image before input manipulation; the horizontal reference lines H1 to H3 orthogonal to the vertical reference line (V); and a direction of movement of the trimmed image. Therefore, such a new trimmed image as described with reference to FIG. 6 can be obtained in response to each direction of movement request. As a result, the trimmed screen image after change makes it possible to easily grasp the positional relation to the host vehicle and it is possible to easily estimate trimmed screen images before and after change.

Second Embodiment

In a second embodiment, the control portion 130 uses a speed signal obtained from the speed sensor 152 and increases the speed of change from the present trimmed image to a new trimmed image with increase in the speed signal. As a result, when the trimming positions of a trimmed image are changed, a new trimmed image can be checked more quickly with increase in vehicle speed; therefore, it is possible to perform sooner danger avoiding driving and this leads to safe driving.

Third Embodiment

In a third embodiment, the control portion 130 performs image trimming processing in accordance with the action of a traffic indicator 153. A more detailed description will be given. In the control portion 130, preferable regions are stored beforehand. The preferable regions are regions in the camera image suitable as a trimmed image for checking the right side or the left side of the vehicle when the vehicle makes a right turn or a left turn. The preferable regions are predetermined ranges in the present disclosure and are set by prior adjustment before driving. When a driver manipulates a traffic indicator 153 and the input portion 120 before driving, an actuation signal from the traffic indicator 153 and an input signal from the input portion 120, that is, a desired region for trimming at a selected camera 110 are inputted to the control portion 130. The control portion 130 then stores the above-mentioned desired region in connection with the actuation signal from the traffic indicator 153. This stored desired region is a preferable region. When a traffic indicator 153 is actuated during driving, the control portion 130 switches the trimmed image of the camera 110 installed on the same side as the actuated traffic indicator to a trimmed image obtained by trimming a stored preferable region.

This makes it possible to more reliably check the right side or the left side of the vehicle when making a right turn or a left turn and this leads to safe driving.

Other Embodiments

The above description of each embodiment is on the assumption that the cameras 110 are provided on both side faces (i.e., both the left side face and the right side face) of a vehicle. The present disclosure is not limited to this and the camera 110 may be singly provided on either side face. In this case, it is advisable that the camera 110 should be provided on the passenger seat side (the side closer to the passenger seat) where the area out of the driver's line of vision is larger. This provides a visibility support apparatus easy to use.

In the first embodiment, two cameras 110 are provided on both the left side face and the right side face of a vehicle. When a trimmed image is moved under R+L being selected by the selector switch 121, the direction of movement of the trimmed image of the camera 110 on the passenger seat side is left-right symmetric with the direction of movement of the trimmed image of the camera 110 on the driver seat side. Instead, both the trimmed images may be moved to an identical direction.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicular visibility support apparatus comprising:
    a camera that is provided on at least either a left side or a right side of a vehicle, picks up an image of a view that is laterally behind the vehicle, and provides a camera image;
    a switch that receives input manipulation performed by an occupant to input a change to a desired region that the occupant desires to view in the camera image provided by the camera;
    an electronic control unit configured to trim the desired region in the camera image to provide a trimmed image based on receiving an input signal generated by the input manipulation with the switch; and
    a display that displays the trimmed image trimmed by the electronic control unit,
    wherein when receiving the input signal due to the input manipulation performed by the occupant under a state where the display displays, as the trimmed image, a first trimmed image, the electronic control unit is further configured to trim the camera image as a second trimmed image based on:
        a vertical reference line including a part of the vehicle in the first trimmed image taking place before the input manipulation is performed by the occupant with the switch, and a horizontal reference line orthogonal to the vertical reference line; and
        a direction of movement for the change to the desired region inputted to the switch,
    wherein the electronic control unit provides the second trimmed image by trimming the camera image, making the part of the vehicle to be maintained in the vertical reference line within the second trimmed image and the pan of the vehicle is displayed in the display, and
    wherein:
    in response to the direction of movement inputted to the switch being a first lateral direction that is either leftward or rightward, the electronic control unit performs a wide angle trimming process that makes the second trimmed image provide, as a covered region, an area that is more distant from the vehicle than the area provided by the first trimmed image,
    in response to the direction of movement inputted to the switch being a second lateral direction that is reverse to the first lateral direction, the electronic control unit performs an enlargement trimming process that makes the second trimmed image provide, as the covered region, an area that is closer to the vehicle than the area provided by the first trimmed image;
    in response to the direction of movement inputted to the switch being upward, the electronic control unit performs an upward trimming process that makes the second trimmed image provide, as the covered region, an area that includes an additional region that is located higher than the area provided by first trimmed image, in response to the direction of movement inputted to the switch being downward, the electronic control unit performs a downward trimming process that makes the second trimmed image provide, as the covered region, an area that includes an additional region that is located lower than the area provided by the first trimmed image.

2. The vehicular visibility support apparatus according to claim 1,
wherein the horizontal reference line is any one of:
a first horizontal reference line positioned at an upper end of the trimmed image; a second horizontal reference line positioned at a center of the trimmed image; and a third horizontal reference line positioned at a lower end of the trimmed image, and
wherein the electronic control unit is further configured to use:
the second horizontal reference line as the horizontal reference line when the direction of movement is any one of upward, downward, rightward, and leftward;
the third horizontal reference line as the horizontal reference line when the direction of movement is either upper rightward or lower leftward; and
the first horizontal reference line as the horizontal reference line when the direction of movement is either lower rightward or upper leftward.

3. The vehicular visibility support apparatus according to claim 1,
wherein a speed signal of the vehicle generated by a speed sensor is inputted to the electronic control unit, and
wherein the electronic control unit is further configured to increase a speed of change to a new trimmed image with increase in the speed signal.

4. The vehicular visibility support apparatus according to claim 1,
wherein an actuation signal from a traffic indicator to indicate left turn or right turn is inputted to the electronic control unit, and
wherein the electronic control unit is further configured to switch the trimmed image to a trimmed image in a predetermined range in the camera image according to the actuation signal from the traffic indicator during driving.

5. The vehicular visibility support apparatus according to claim 4,
wherein when both an actuation signal from the traffic indicator and an input signal from the switch are inputted before driving, the electronic control unit is further configured to store the desired region in the camera image in connection with the actuation signal from the traffic indicator, and
wherein a trimmed image in the stored desired region is used as a trimmed image in the predetermined range.

6. The vehicular visibility support apparatus according to claim 1,
wherein the camera is provided on each of the left side and the right side of the vehicle and is provided as each of a camera on a driver seat side and a camera on a passenger seat side, and
wherein when a target of input manipulation with the switch is camera images of both the camera on the driver seat side and the camera on the passenger seat side,
the electronic control unit is further configured to trim a camera image of the camera on the driver seat side and trim a camera image of the camera on the passenger seat side so that the camera image of the camera on the driver seat side and the camera image of the camera on the passenger seat side are left-right symmetrical.

7. The vehicular visibility support apparatus according to claim 1,
wherein the camera is provided on a passenger seat side.

8. A vehicular visibility support apparatus comprising:
a camera that is provided on a side that is a left side or a right side of a vehicle, picks up an image of a view that is laterally behind the vehicle, and provides a camera image;
a switch that receives input manipulation performed by an occupant to input a change to a desired region that the occupant desires to view in the camera image provided by the camera;
an electronic control unit configured to trim the desired region in the camera image to provide a trimmed image based on receiving an input signal generated by the input manipulation with the switch; and
a display that displays the trimmed image trimmed by the electronic control unit,
wherein, when the input manipulation is performed by the occupant,
the electronic control unit is further configured to
permit a second trimmed image corresponding to the desired region to contain a vertical reference line including a part of the vehicle in a first trimmed image taking place before the input manipulation is performed by the occupant to display the second trimmed image,
by changing a size of an image trimmed from the camera image such that a dimension of the second trimmed image along a horizontal reference line orthogonal to the vertical reference line is a predetermined multiple of a dimension of the second trimmed image along the vertical reference line,
wherein when the electronic control unit provides the second trimmed image by trimming the camera image, the part of the vehicle is caused to be maintained in the vertical reference line within the second trimmed image and the vehicle is caused to be partially displayed in the display,
wherein:
in response to the direction of movement inputted to the switch being a first lateral direction that is either leftward or rightward, the electronic control unit performs a wide angle trimming process that makes the second trimmed image provide, as a covered region, an area that is more distant from the vehicle than the area provided by the first trimmed image,
in response to the direction of movement inputted to the switch being a second lateral direction that is reverse to the first lateral direction, the electronic control unit performs an enlargement trimming process that makes the second trimmed image provide, as the covered region, an area that is closer to the vehicle than the area provided by the first trimmed image:
in response to the direction of movement inputted to the switch being upward, the electronic control unit performs an upward trimming process that makes the second trimmed image provide, as the covered region, an area that includes an additional region that is located higher than the area provided by the first trimmed image,
in response to the direction of movement inputted to the switch being downward, the electronic control unit performs a downward trimming process that makes the second trimmed image provide, as the covered region, an area that includes an additional region that is located lower than the area provided by the first trimmed image.

9. The vehicular visibility support apparatus according to claim 1,
wherein the trimmed image is displayed in the display, the vehicle is always displayed partially along the side of the trimmed image being displayed.

10. The vehicular visibility support apparatus according to claim 8,
wherein the second trimmed image is displayed in the display, the vehicle is always displayed partially along the side of the second trimmed image being displayed.

11. The vehicular visibility support apparatus according to claim 1,
wherein the camera is provided on a driver seat side of the vehicle.

12. The vehicular visibility support apparatus according to claim 1,
wherein the first direction is defined as a direction from a lateral center of the vehicle to a driver seat side of the vehicle.

13. The vehicular visibility support apparatus according to claim 1,
wherein the horizontal reference line includes:
a first horizontal reference line positioned at an upper end of the trimmed image;
a second horizontal reference line positioned at a center of the trimmed image; and
a third horizontal reference line positioned at a lower end of the trimmed image, and
wherein
under a condition that a driver seat of the vehicle is located at a right side of the vehicle:
in response to the direction of movement inputted to the switch being either lower rightward or upper leftward,
the first horizontal reference line of the first trimmed image is used as the first horizontal reference line of the second trimmed image,
the second horizontal reference line of the first trimmed image is different from the second horizontal reference line of the second trimmed image, and
the third horizontal reference line of the first trimmed image is different from the third horizontal reference line of the second trimmed image;
in response to the direction of movement inputted to the switch being either upper rightward or lower leftward,
the third horizontal reference line of the first trimmed image is used as the third horizontal reference line of the second trimmed image,
the second horizontal reference line of the first trimmed image is different from the second horizontal reference line of the second trimmed image, and
the first horizontal reference line of the first trimmed image is different from the first horizontal reference line of the second trimmed image;
wherein
under a condition that a driver seat of the vehicle is located at a left side of the vehicle:
in response to the direction of movement inputted to the switch being either lower leftward or upper rightward,
the first horizontal reference line of the first trimmed image is used as the first horizontal reference line of the second trimmed image,
the second horizontal reference line of the first trimmed image is different from the second horizontal reference line of the second trimmed image, and
the third horizontal reference line of the first trimmed image is different from the third horizontal reference line of the second trimmed image;
in response to the direction of movement inputted to the switch being either upper leftward or lower rightward,
the third horizontal reference line of the first trimmed image is used as the third horizontal reference line of the second trimmed image,
the second horizontal reference line of the first trimmed image is different from the second horizontal reference line of the second trimmed image, and
the first horizontal reference line of the first trimmed image is different from the first horizontal reference line of the second trimmed image.

14. The vehicular visibility support apparatus according to claim 8,
wherein the camera is provided on a driver seat side of the vehicle.

15. The vehicular visibility support apparatus according to claim 8,
wherein the first direction is defined as a direction from a lateral center of the vehicle to a driver seat side of the vehicle.

* * * * *